(12) United States Patent
Nagarajan et al.

(10) Patent No.: US 7,394,953 B1
(45) Date of Patent: Jul. 1, 2008

(54) CONFIGURABLE INTEGRATED OPTICAL COMBINERS AND DECOMBINERS

(75) Inventors: Radhakrishnan L. Nagarajan, Cupertino, CA (US); Masaki Kato, Sunnyvale, CA (US); Peter W. Evans, Mountain House, CA (US); Jacco L. Pleumeekers, Mountain View, CA (US); Mehrdad Ziari, Pleasanton, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 11/734,259

(22) Filed: Apr. 11, 2007

Related U.S. Application Data

(60) Provisional application No. 60/744,665, filed on Apr. 11, 2006.

(51) Int. Cl.
*G02B 6/34* (2006.01)
*G02B 6/26* (2006.01)
*G02B 6/42* (2006.01)

(52) U.S. Cl. .............................. 385/37; 385/14; 385/15; 385/31; 385/46; 385/50; 250/227.11; 250/227.23

(58) Field of Classification Search .................... 385/37
See application file for complete search history.

(56) References Cited

U.S. PATENT DOCUMENTS

2003/0095736 A1    5/2003   Kish et al.
2003/0095737 A1 *  5/2003   Welch et al. .................. 385/14
2004/0033004 A1    2/2004   Welch et al.
2006/0141649 A1    6/2006   Joyner et al.

OTHER PUBLICATIONS

Nagarajan et al., "Large-Scale Photonic Integrated Circuits", *IEEE Journal of Selected Topics in Quantum Electronics*, Jan./Feb. 2005, pp. 50-65, vol. 11(1).

* cited by examiner

*Primary Examiner*—Frank G Font
*Assistant Examiner*—Ryan Lepisto
(74) *Attorney, Agent, or Firm*—North Weber & Baugh LLP

(57) ABSTRACT

System, devices and methods are described that provide an integrated optical decombiner or optical combiner having both unamplified paths and amplified paths on which power monitoring and control may be located. A preferred multiplexing/demultiplexing optical path through the combiner/decombiner and a corresponding waveguide output/input is identified and optically coupled to a piece of fiber. Temperature control may be provided to tune an arrayed waveguide grating within the combiner/decombiner and minimize wavelength drift therein. Integrated power monitoring may be employed on one or more of the amplified waveguide paths to ensure that a preferred power level or range is maintained on an optical signal.

36 Claims, 11 Drawing Sheets

CONFIGURABLE INTEGRATED OPTICAL COMBINERS AND DECOMBINERS

CROSS REFERENCE TO RELATED PATENT APPLICATIONS

This application claims priority to U.S. Provisional Application Ser. No. 60/744,665, entitled "Photonic Integrated Circuits (PICs) with Multiple Inputs or Outputs with and without Semiconductor Optical Amplifiers (SOAs) and PICs with Power Monitoring for In-Circuit SOA Power Control," filed Apr. 11, 2006.

BACKGROUND

A. Technical Field

This invention relates generally to integrated optical components, and more particularly, to integrated optical combiners and decombiner, such as a photonic integrated circuit (hereinafter, "PIC"), having a plurality of different input/output configurations.

B. Background of the Invention

The importance of high speed networks, such as optical WDM networks, is well understood by one skilled in the art.

FIG. 1 illustrates an exemplary WDM network in which a plurality of wavelength channels is communicated between network nodes. A transmitting node comprises an optical combiner 5 having a plurality of inputs 4 on which wavelength signals are provided. The optical combiner 5 optically multiplexes these wavelengths into a single WDM signal and outputs this WDM signal into a piece of optical fiber 6. An optical fiber span, coupling the networking nodes, may include multiple amplifier nodes 7 that may re-amplify, re-shape, re-time or otherwise process the WDM signal.

A receiving node comprises an optical decombiner 8 having an input on which the WDM signal is received. The optical decombiner optically demultiplexes the WDM signal into its component wavelength signals and outputs these wavelength signals on a plurality of outputs 9. These outputs may be coupled to a plurality of photodetectors that convert the wavelength signals into corresponding electrical signals.

These optical combining and decombining components are traditionally located in relatively large and expensive modules within optical transponders. There is a trend in the optical component field to integrate active and passive optical components on a single monolithic chip, such a silica/$SiO_2$-based chips or InP-based chips in order to reduce the cost of these components. For example, certain optical components may be integrated within a single transmitting photonic integrated circuit (hereinafter, "TxPIC") chip having multiple signal channels, each channel having a modulated optical source for producing channel signals of different wavelengths. A description of an exemplary TxPIC may be found in the published article of Nagarajan et al. entitled, "Large-Scale Photonic Integrated Circuits", *IEEE Journal of Selected Topics in Quantum Electronics*, Vol. 11 (1), pp. 50-65, January/February 2005. (See also U.S. patent application, entitled "Transmitter Photonic Integrated Circuits (TxPIC) and Optical Transport Networks Employing TxPICs," U.S. Patent Application Publication No. 20030095737, which is incorporated herein by reference in its entirety)

A receiving photonic integrated circuit (hereinafter, "RxPIC") chip is also known in which optical receiving components are integrated into a single monolithic chip. (See U.S. patent application, entitled "Optical Signal Receiver Photonic Integrated Circuit (RxPIC), an Associated Optical Signal Transmitter Photonic Integrated Circuit (TxPIC) and an Optical Network Transmission System Utilizing these Circuits," U.S. Patent Application Publication No. 20040033004, which application is incorporated herein by reference in its entirety) In the deployment of an optical receiver, such as an RxPIC, it is oftentimes necessary to provide pre-amplification functionality for the WDM signal prior to it entering demultiplexing and detecting elements. This pre-amplification may be necessary to compensate for attenuation and other losses of a WDM signal that has propagated along an optical link. One function of the pre-amplification is to ensure that the WDM signal power is within a preferred range so that accurate demultiplexing and detection may be performed.

The WDM signal may also experience polarization dependent effects (hereinafter, "PDEs"), such as polarization dependent loss (hereinafter, "PDL") and polarization dependent gain (hereinafter, "PDG"), where the polarization modes of the signal propagating along the fiber randomly vary in relation to time and wavelength. When the WDM signal reaches the receiver, its polarization components may have unknown magnitudes and phases relative to one another.

Optical amplifiers, such as those optical amplifier nodes previously described, are positioned along the link to compensate for signal attenuation and other degradations. These optical amplifiers have traditionally been a fiber amplifier, such as an EDFA; however, semiconductor optical amplifiers (hereinafter, "SOAs") may also be available and designed to provide sufficient gain and low PDEs at designed operational gain level. SOAs are generally considered preferable over EDFAs because EDFAs are bulky, expensive and require optical laser pumps to provide optical stimulation to their rare earth content therein. On the other hand, SOAs are very small in comparison, are amendable to integration, and are pumped by a bias current within the SOA substrate.

With the advent now of integrated optical chips, such as RxPIC and TxPIC chips, it would be desirable to extend integration of the optical amplifiers into the receiver and transmitter chips. However, the integration and sensible realization of these optical amplifiers present certain difficulties. For instance, WDM signals experience different types of degradations in their propagation in metro- and long-haul transmission fibers. These transmission fibers are generally different lengths, which may vary between 10 km-100 km from one node to the next. The pre-amplification requirements of a WDM signal may vary depending on the length of an optical link on which the WDM signal was transmitted and the particular profile of that link. The amount of gain may also depend on how much noise is on the WDM signal and the particular detectors used within the receiver. As a result, it would be preferred to manufacture an integrated receiver circuit that has an integrated input amplifier functionality which can provide different levels of gain and different gain characteristics to the WDM signal.

While a SOA can be biased to provide different levels of gain, the variance of its gain level may cause changes in its PDG so that it will no longer be effective in providing an appropriate gain to certain incoming WDM signals. In fact, if a gain is improperly applied, it may result in further deterioration of the WDM signal. Accordingly, it is important that gain functionality be integrated in which the gain characteristics, beyond just an average applied gain, may be adjusted relative to the optical system and environment in which the chip will function.

There are also situations where it may be desirable to have an integrated receiver chip comprise an input that does not have integrated pre-amplification elements, such as an integrated SOA. Pre-amplification requirements may be obviated by using a link profile to transmit a WDM signal at a particular power profile so that it is received within a desirable power range. Furthermore, external pre-amplification elements may be provided that apply a gain to the WDM signal, obviating the need for integrated amplification functionality.

These same issues may be applied to integrated transmitting chips, such as a TxPIC, in which post amplification may be required. In particular, an amplifier may be required to apply a gain to a WDM signal that was generated by an optical combiner. This post-amplification may be done by an integrated SOA or an external SOA depending on the design of the optical system.

Accordingly, what is needed is a configurable optical combiner and decombiner that may be configured to operate in numerous different types of optical systems and provide both integrated amplified and unamplified waveguide paths.

SUMMARY OF THE INVENTION

Systems, devices and methods are described in which an integrated optical combiner or decombiner is manufactured having a plurality of configurable unamplified waveguide paths and amplified waveguide paths on which power monitoring are located. These varying types of amplified and unamplified inputs or outputs allow for a preferred multiplexing or demultiplexing path to be defined within the optical combiner/decombiner. In various embodiments of the invention, an optical decombiner has a plurality of available waveguide inputs, including amplified and unamplified paths, each optically interfacing with a unique vernier on an input free space region of the optical decombiner. In various other embodiments of the invention, an optical combiner has a plurality of available waveguide outputs path, including both amplified and unamplified paths, each optically interfacing with a unique vernier on an output free space region of the optical combiner.

A preferred multiplexing/demultiplexing optical path through the combiner/decombiner and a corresponding waveguide output/input is identified and optically coupled to a piece of fiber. At initial configuration of an optical combiner, an integrated output waveguide and vernier facet on the optical combiner is optically coupled to a fiber in order to define a multiplexing path through the combiner. This optical combiner may be an arrayed wavelength grating (hereinafter, "AWG") that comprises an input free space region, a plurality of grating arms, and an output free space region. At initial configuration of an optical decombiner, an integrated input waveguide and vernier facet on the optical decombiner is optically coupled to a fiber in order to define a demultiplexing path through the decombiner. This optical decombiner may also be an AWG as previously described.

The ability to select a single multiplexing or demultiplexing path from a plurality of available paths through an AWG allows the device to be optimized relative to the environment and system in which it operates. The wavelength channels within an optical system, the temperature at which the AWG operates, and other factors affect the performance of the AWG; all of which may be addressed by selecting a particular multiplexing or demultiplexing path at initial configuration.

Temperature control may be provided to tune an AWG within the combiner/decombiner and minimize wavelength drift therein. In certain embodiments of the invention, this temperature control may be provided by an AWG heater that provides a fine tuning on the AWG to optimize the coupling and insertion loss between an integrated chip, such as an RxPIC or TxPIC, and the optical fibers.

Integrated power monitoring may be employed on one or more of the amplified waveguide paths to ensure that a preferred power level or range is maintained on an optical signal. These integrated power monitors may include various types of photodetectors such as tap couplers, in-line detectors, parallel or evanescent photodetectors, scattered light photodetectors, resonant resonators, and other types of photodetectors known by one skilled in the art.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. ("FIG.") 1 illustrates an exemplary general WDM optical networking system.

DETAILED DESCRIPTION OF THE PREFERRED EMBODIMENTS

Systems, devices and methods are described for a configurable integrated optical decombiner or optical combiner. In various embodiments of the invention, an optical decombiner is provided having a plurality of available waveguide inputs including configurable amplified and unamplified waveguide inputs. At configuration of the optical decombiner, a single waveguide input is selected in relation to a preferred demultiplexing path through the optical decombiner. In various other embodiments of the invention, an optical combiner is provided having a plurality of available waveguide outputs path including configurable amplified and unamplified waveguide outputs. At configuration of the optical combiner, a single waveguide output is selected in relation to a preferred multiplexing path through the optical combiner.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different optical networking systems and devices. Structures and devices shown below in block diagram are illustrative of exemplary embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. Integrated Optical Decombiner

Figure 1:
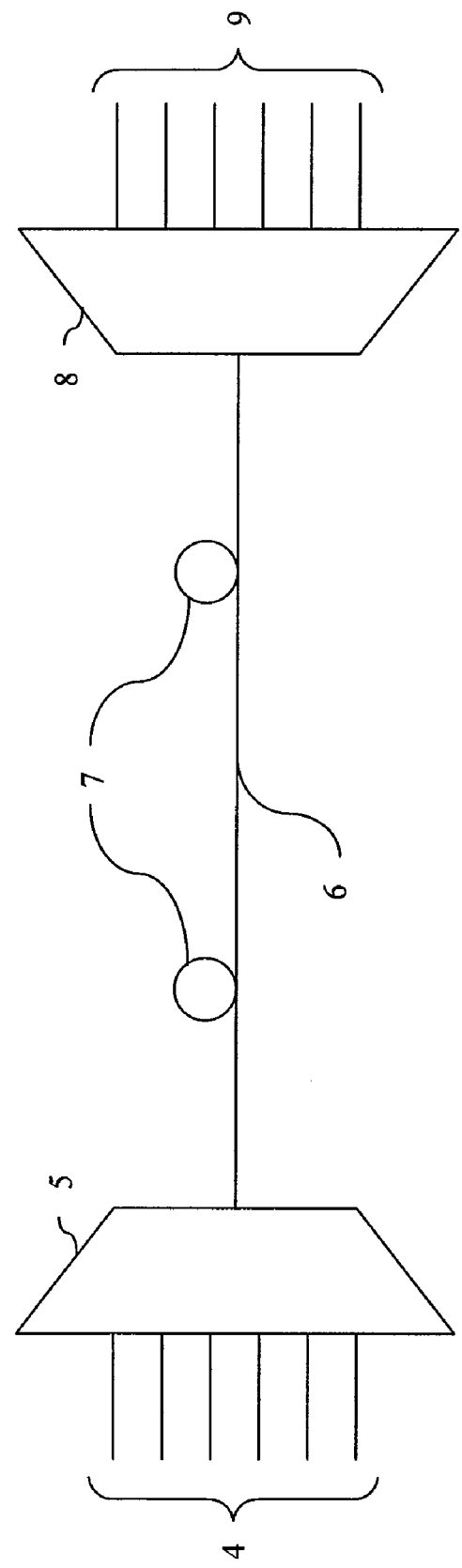
Figure 2:
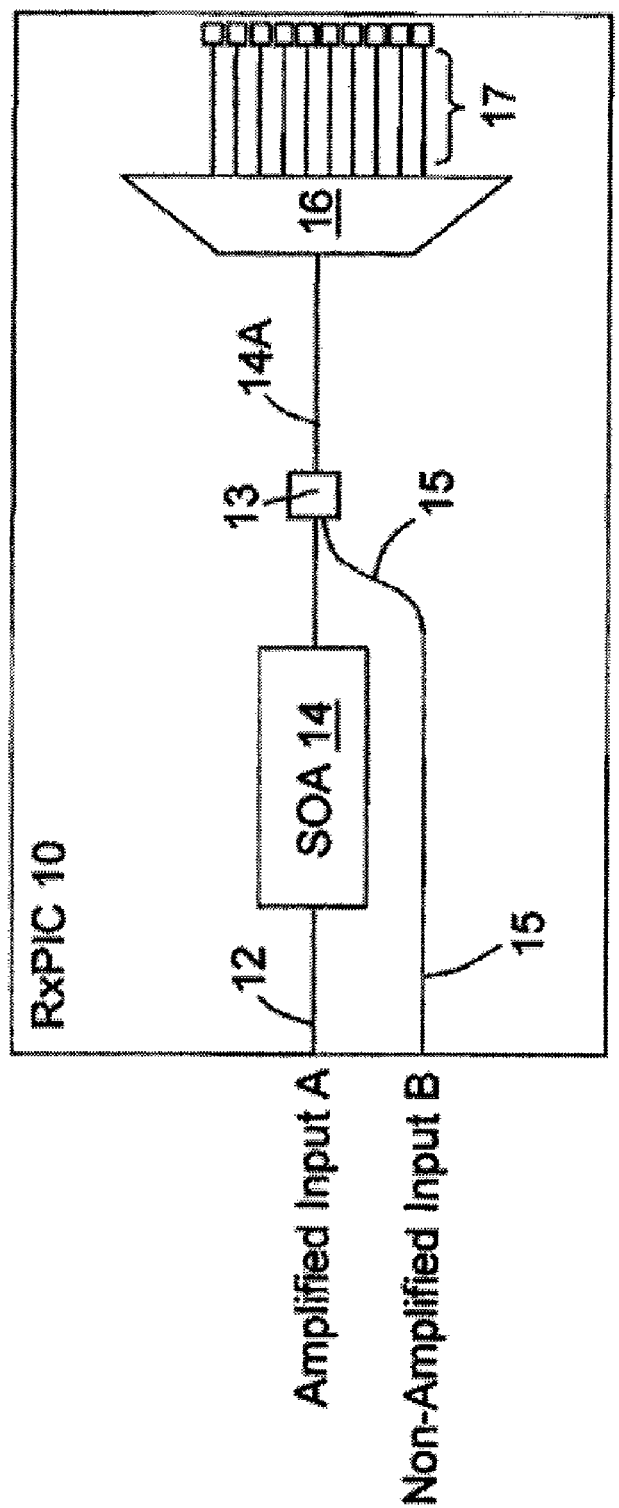
FIG. 2 illustrates an integrated optical receiver having an optical decombiner and a plurality of available inputs according to various embodiments of the invention.

FIG. 2 illustrates a diagram of an optical decombiner system having both amplified and unamplified input paths. In this particular example, an optical decombiner integrated within an RxPIC is described; however, one skilled in the art will recognize that the present invention may be applied to other integrated optical circuitry. A more detailed description of various embodiments of an RxPIC may be found within U.S. patent application, entitled, "Method of Reducing Insertion Loss in a Transition Region between a Plurality of Input or Output Waveguides to a Free Space Coupler Region," U.S. Patent Application Publication No. 20060141649, which application is incorporated by reference in its entirety.

An integrated optical decombiner circuit, such as an RxPIC 10, comprises an optical decombiner 16 having a plurality of optical input paths from which a single path may be selected. The optical decombiner 16 outputs multiple optical channels or wavelengths 17 that are separated from the optical input signal. The multiple outputs 17 may include integrated photodetectors that convert these optical signals into corresponding electrical signals.

The plurality of optical waveguide inputs includes at least one non-amplified input 15 and at least one amplified input 12, on which a semiconductor optical amplifier (hereinafter, "SOA") 14 is integrated. These inputs also include an optical coupler 13 that interfaces with waveguides 14A that define multiple demultiplexing paths through the optical decombiner 16. During initial configuration of the optical decombiner 16, the multiple inputs may be tested in order to identify a preferred demultiplexing path, so that the corresponding input may be coupled to the fiber. This preferred demultiplexing path may be related to a coupling vernier in which a relatively lower amount of power is lost between the input WDM signal and the demultiplexed optical signal wavelengths.

Various factors may affect the transmission of a WDM optical signal, and its individual wavelengths, through the optical decombiner 16. These factors include the particular wavelengths within the WDM signal, the temperature at which the optical decombiner 16 is operating, manufacturing characteristics of the optical decombiner 16, and other factors recognized by one skilled in the art.

Figure 3:
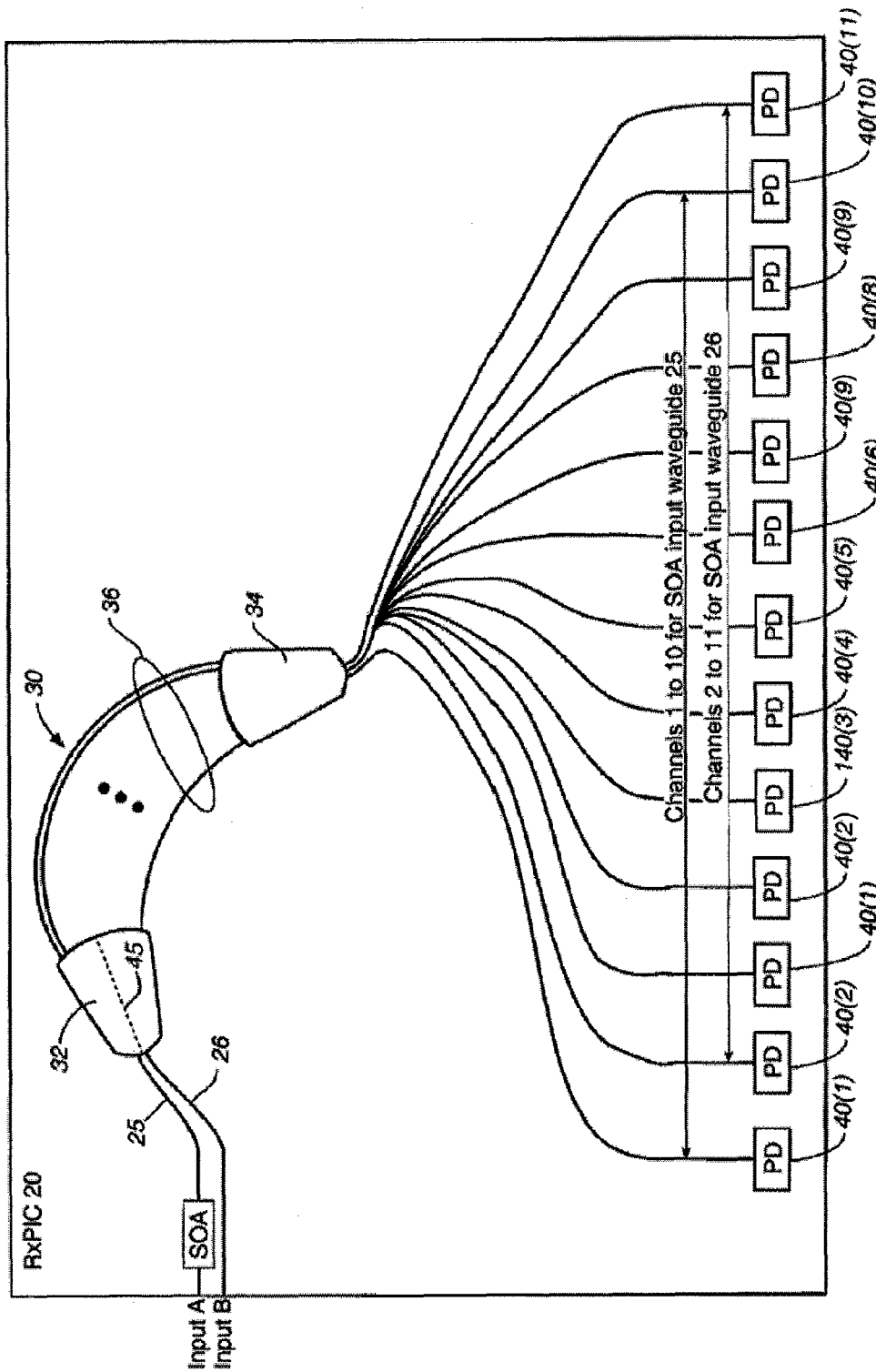
FIG. 3 is a detailed illustration of an integrated arrayed wavelength grating and a plurality of available inputs according to various embodiments of the invention.

FIG. 3 is a detailed illustration of an optical decombiner in accordance with various embodiments of the invention. A monolithic RxPIC 20 comprises a plurality of input waveguides 25, 26 some of which are amplified waveguide inputs and some of which are unamplified waveguide inputs. The amplified inputs, such as input path A 25, comprise one or more SOAs that apply a respective gain to one or more of the optical wavelengths within the WDM signal being transmitted on the amplified input 25. Furthermore, the amplified inputs may also comprise power monitoring and control devices that monitor the optical power level of the optical signal therein and cause a gain adjustment on one or more of the optical amplifiers on the input 25. Various embodiments of these power monitoring and control devices are described in more detail later in the application. One skilled in the art will recognize that the total number of waveguide inputs and the ratio between amplified inputs and unamplified inputs may vary.

The plurality of waveguide inputs allow a single input to be selected and optically coupled to define a preferred optical demultiplexing path for the WDM signal through the optical decombiner, such as an arrayed waveguide array (hereinafter, "AWG") 30. The AWG 30 comprises an input slab or first free space region 32 and an output slab or output free space region 34, which are optically coupled by an array of grating arms 36 of different, increasing lengths ($\Delta L$), so that a predetermined phase difference is established in waveguides according to the wavelengths $\lambda_1$-$\lambda_N$ that were combined in the incoming WDM signal. A plurality of demultiplexing signal paths may be defined through the first free space region 32, the grating arms 36, and the second free space region 34.

The AWG 30 has multiple waveguide and verneir inputs that allow a demultiplexing signal path to be selected through the AWG 30. In this particular embodiment, an amplified input waveguide 25 and an unamplified input waveguide 26 are integrated within the RxPIC and are optically coupled to the AWG 30. The inputs 25, 26 are designed such that the amplified input 25 is offset to one side of centerline 45 of the zero order Brillouin zone of the AWG 30 and the unamplified input 26 is offset to the other side of centerline 45 of the zero order Brillouin zone of the AWG 30. In other embodiments, the input waveguides may not be symmetrically located relative to the centerline 45 of the zero order Brillouin zone of the AWG 30. These different input locations and varying amplified/unamplified signal paths allow an optical path through the AWG 30 to be selected relative to the characteristics of the particular AWG 30 and the system and environment in which the RxPIC 20 is going to function.

The AWG 30 also comprises a plurality of output channels, such as channels 1-10 corresponding to input waveguide 25 and channels 2-11 corresponding to input waveguide 24. One skilled in the art will recognize that the output channels that are active relate to the input used on the first free space region 32 and the characteristics of the WDM input signal (e.g., the number of channels and particular wavelengths within the WDM signal). The power levels on each of these output channels may be controlled depending on which type of input (i.e., amplified or unamplified signal path) is selected.

The output channels may also comprise one or more additional in-circuit photodetectors (hereinafter, "PD") 40 on the RxPIC 20 so that if the amplified input 25 with the SOA is chosen, then an incoming WDM signal having ten channel signals is demultiplexed to PDs 40(1) to 40(10). On the other hand, if the unamplified input 26 is chosen, then an incoming WDM signal having ten channel signals is demultiplexed to PDs 40(2) to 40 (11). An advantage of this particular implementation is that an optical 3 dB coupler 13 need not be used.

Figure 4:
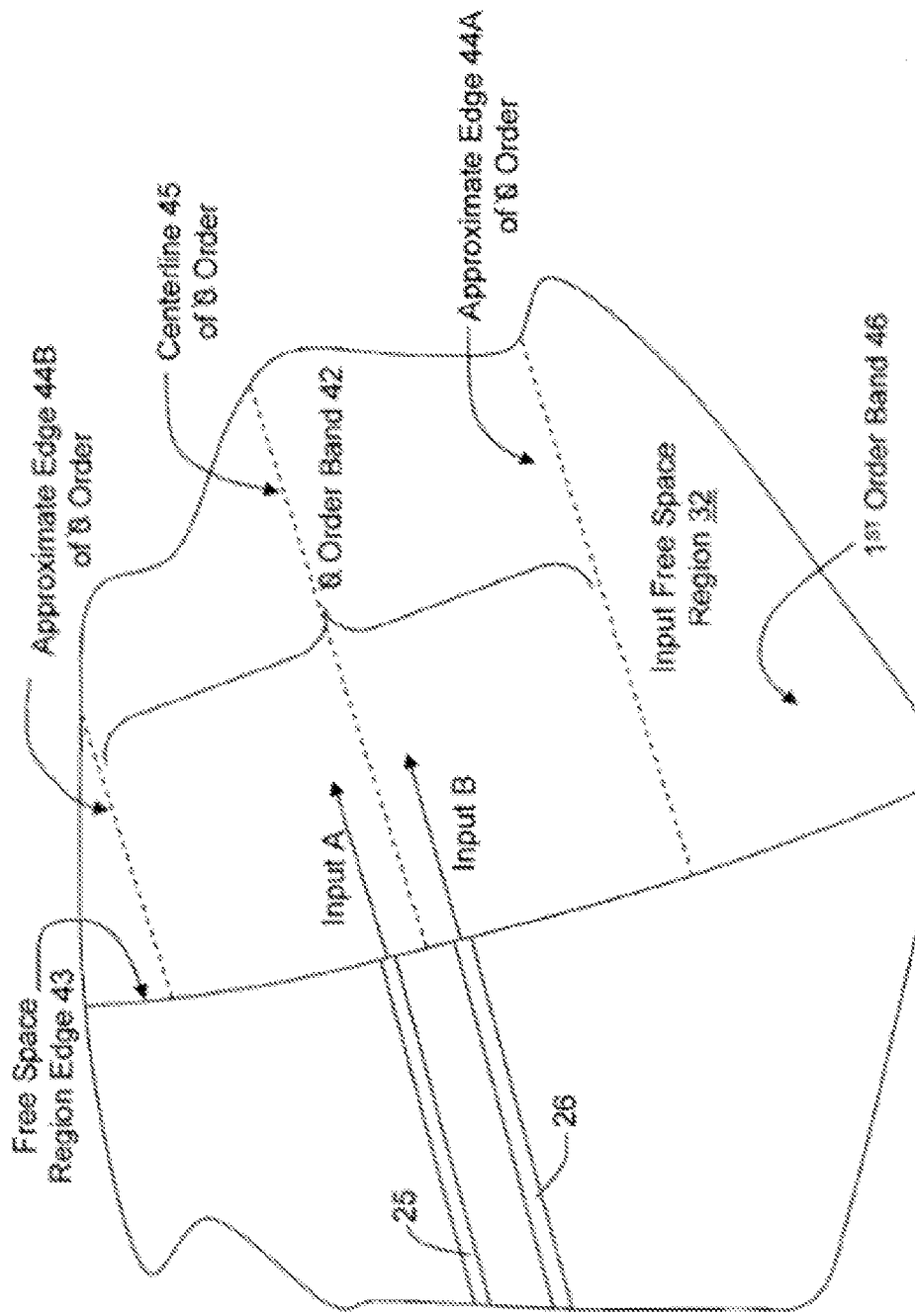
FIG. 4 is an illustration of an input free space region of an arrayed wavelength grating and a plurality of available inputs according to various embodiments of the invention.

FIG. 4 is a detailed illustration of an input free space region of an AWG 30 according to various embodiments of the invention. The input free space region 32 provides unguided signal propagation and comprises a free space region edge 43, a zero order band 42 defined by a first approximate edge of zero order 44A and a second approximate edge of zero order 44B, as well as other regions such as a first order band 46. The free space region edge 43 has a plurality of verniers, each optically interfacing with an input waveguide, such as input waveguides 25 and 26. The location of these verniers relates to a particular path through the free space region 32. Each path optically couples to one or more corresponding grating arms 36 that result in demultiplexing of an incoming WDM signal into its wavelengths on output optical channels.

The input waveguides 25, 26 are symmetrically located relative to the centerline of the zero order band 45. Although FIG. 4 shows only two input waveguides, one skilled in the art will recognize that any number of input waveguides may be integrated and optically interfaced with the free space region 32. Furthermore, these input waveguides may be any combination of amplified and non-amplified input waveguide paths. As will be discussed in more detail, these amplified paths may also contain power monitor and control functionality that ensure the incoming WDM signal is at a preferred optical power level or range.

The transmission characteristics of the free space region 32 may change relative to various factors including the wavelengths within the WDM signal, the temperature in which the AWG 30 is operating, and other factors known by one of skill in the art. Accordingly, a particular WDM signal may have a preferred demultiplexing path through the AWG, and thus a corresponding input vernier on the free space region 32.

Figure 5:
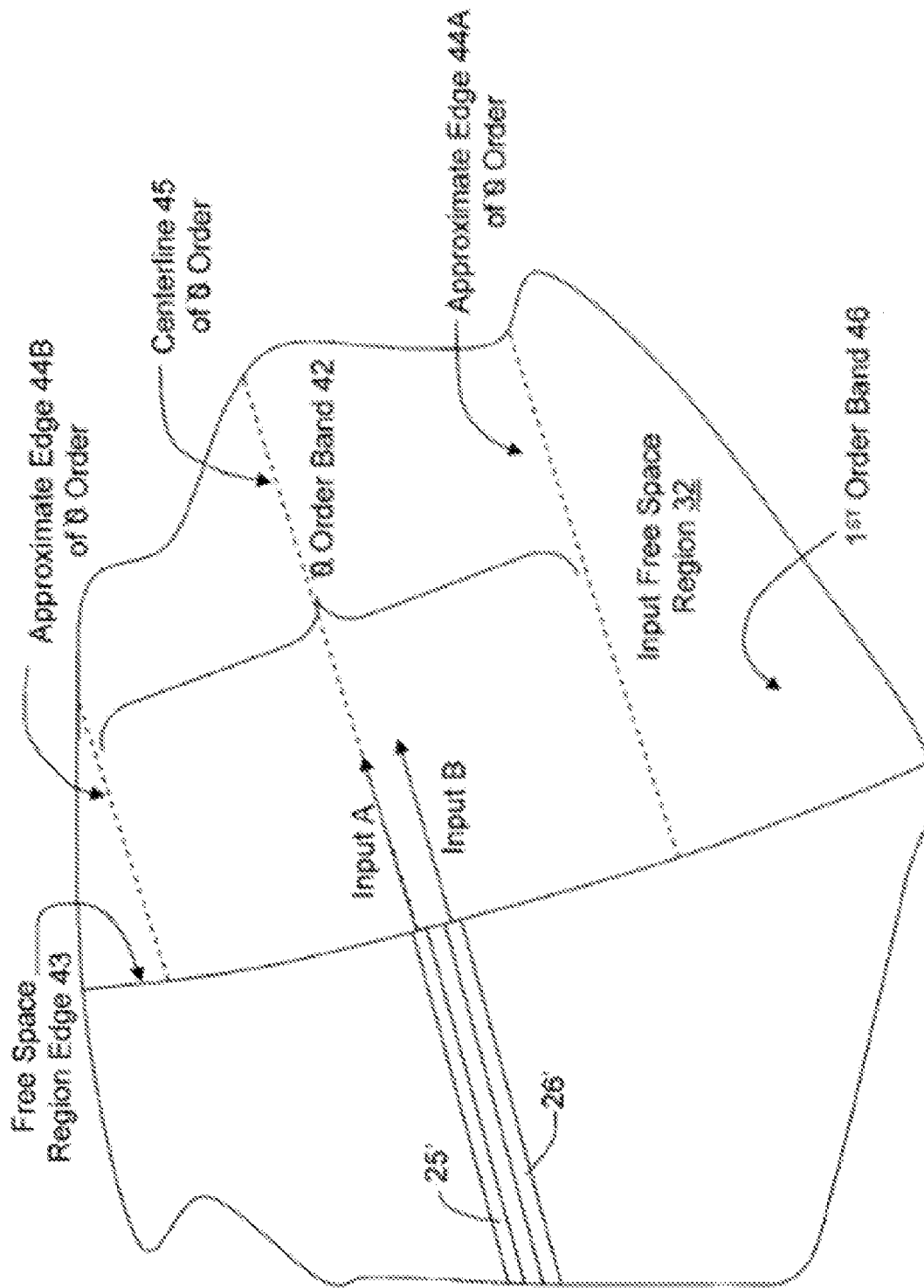
FIG. 5 is another illustration of an input free space region of an arrayed wavelength grating and a plurality of available inputs according to various embodiments of the invention.

FIG. 5 is another detailed illustration of an input free space region 32 of an AWG 30 according to other various embodiments of the invention. As previously discussed, the location of the input waveguides on the free space region edge 43 may vary, an example of which is illustrated in FIG. 5. In this embodiment, the amplified input waveguide 25' is positioned on the centerline 45 of the input free space region 32 whereas the unamplified input on waveguide 26' is offset from centerline 45. This example may be particularly relevant if a certain waveguide input is to be selected in a majority of instances and the centerline 45 has preferred transmission characteristics.

Figure 6:
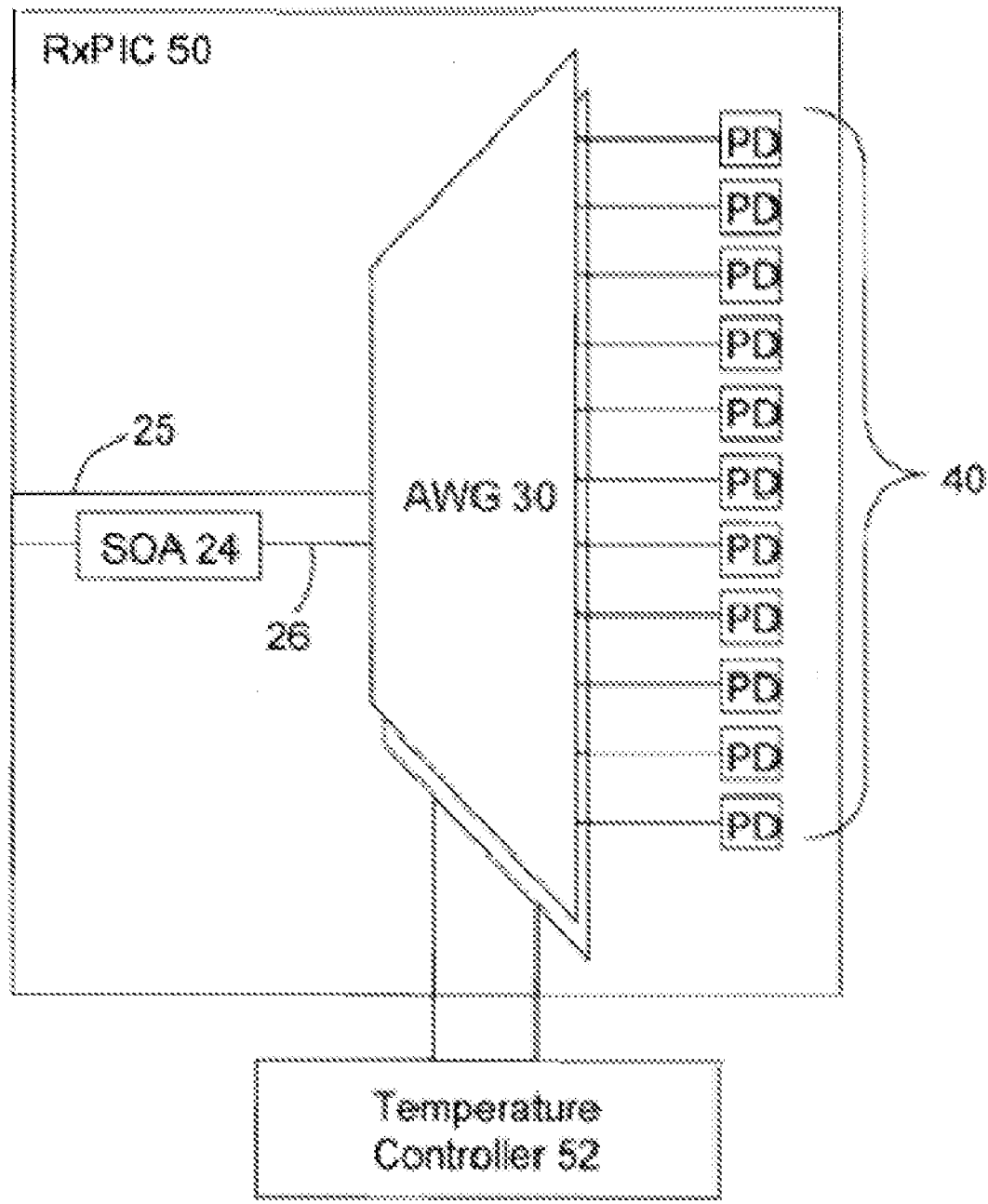
FIG. 6 is a diagram of a temperature controlled arrayed wavelength grating and a plurality of available inputs according to various embodiments of the invention.

FIG. 6 illustrates an array of integrated optical decombiners and a temperature controller according to various embodiments of the invention. In one embodiment, an RxPIC is communicatively coupled to a temperature controller 52 that controls the temperature of the RxPIC, and in particular, the AWGs 30. As previously discussed, certain characteristics of the AWG 30 may change relative to temperature. For example, the temperature on an AWG 30 may be controlled by an AWG heater so that the center wavelength of the AWG 30 wavelength grid can be adjusted to either accept a WDM signal input either on unamplified waveguide input 25 or on amplified waveguide input 26 containing the SOA 24. The AWG 30 may be tuned to a particular input by controlling its temperature depending upon which way the AWG wavelength grid is shift by temperature tuning. An example of temperature tuning of an AWG may be found in patent application, entitled "Transmitter Photonic Integrated Circuit (TxPIC) Chip Architectures and Drive Systems and Wavelength Stabilization for TxPICs," U.S. Patent Application Publication No. 20030095736, which is incorporated herein by reference in its entirety.

The ability to tune the AWG using temperature allows fine tuning functionality that may be employed at initial configuration of the AWG and over time as the AWG ages. This fine tuning can compensate for frequency drift that occurs by modifying the operating temperature of the AWG, which affect the coupling and transmission characteristics of the decombiner.

The ability to tune the AWG 30 by a temperature controller 52 may potentially reduce the number of on-chip PDs 40 manufactured on the RxPIC 50. In particular, because the wavelength grid of the AWG 30 may be shifted via temperature to adjust for either unamplified input 25 or amplified input 26, the output channels corresponding to these different input waveguides can be designed to be at least partially common between the inputs. One skilled in the art will recognize the various benefits of tuning the AWG 30 using a temperature controller, such as an AWG heater.

Figure 7:
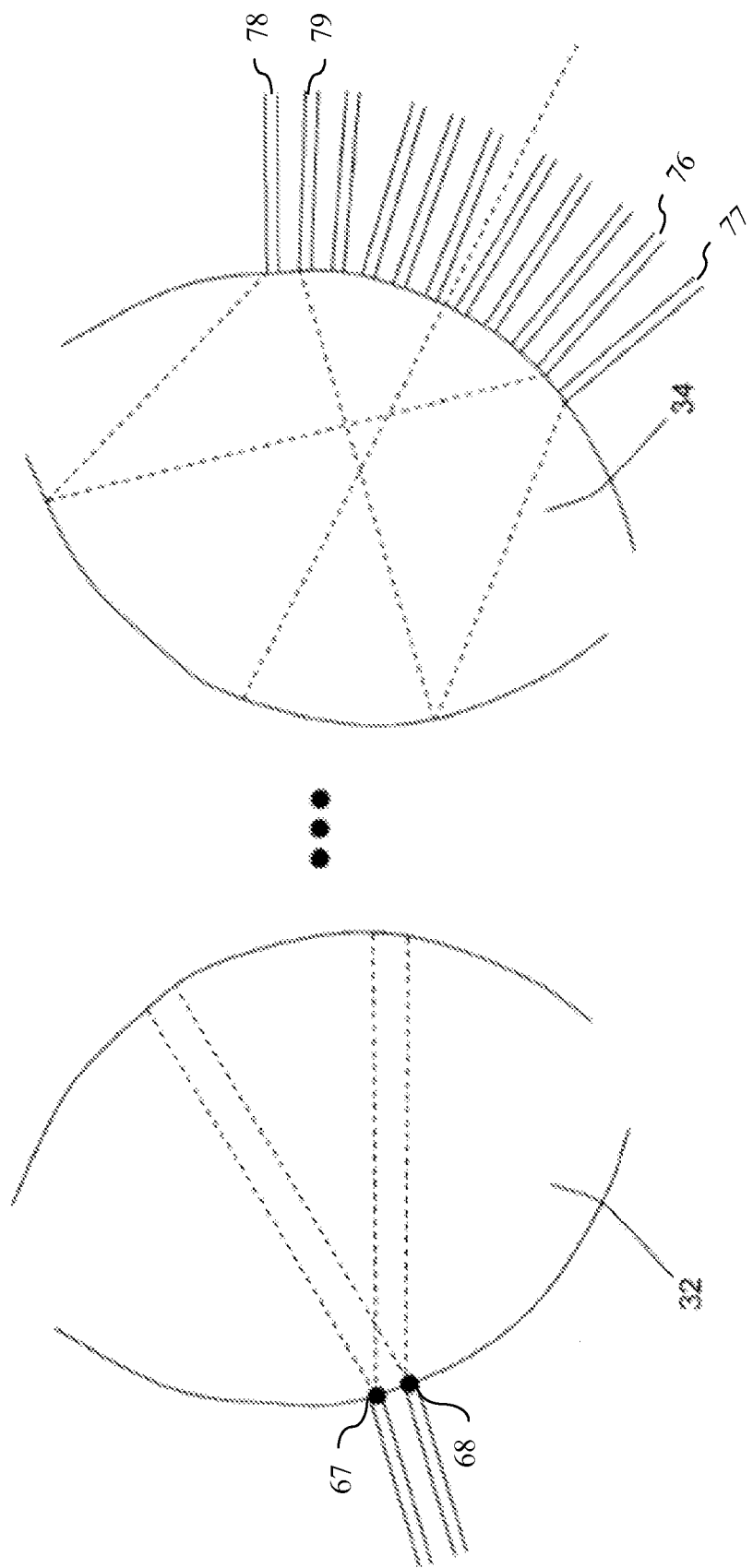
FIG. 7 is an illustration of an input free space region and an output free space region, and corresponding demultiplexing paths, according to various embodiments of the invention.

FIG. 7 is a beam illustration of the output beam divergence of an AWG 30 output free space region relative to the respectively different inputs at the AWG 30 input free space region according to various embodiments of the invention. As shown, a first waveguide input 67 and a second waveguide input 68 are optically coupled to an input free space region 32 at certain verniers.

A diffraction pattern is defined for the first vernier that optically couples with the first waveguide input 67 and a separate diffraction pattern is defined for the second vernier that optically couples the second waveguide input 68. These diffraction patterns depend on the individual wavelengths within the WDM signal being transmitted on the relevant waveguide input. According to various embodiments, these diffraction patterns result in demultiplexed channels being separated from the WDM signal, traversing the AWG, and being output on output channels 76, 77, 78, 79 that are spaced in accordance with $\Delta\lambda$ for each of the wavelengths within the WDM signal. Thus, a WDM signal on the first waveguide input 67 is separated into component wavelengths that are eventually transmitted on output channels 78, 79. Comparatively, a WDM signal on the second waveguide input 68 is separated into component wavelengths that are eventually transmitted on output channels 76, 77. One skilled in the art will recognize that a optical demultiplexer, such as an AWG, may be designed to have various different diffraction patterns, all of which are intended to fall within the scope of the present invention.

Figures 8A, 8B:
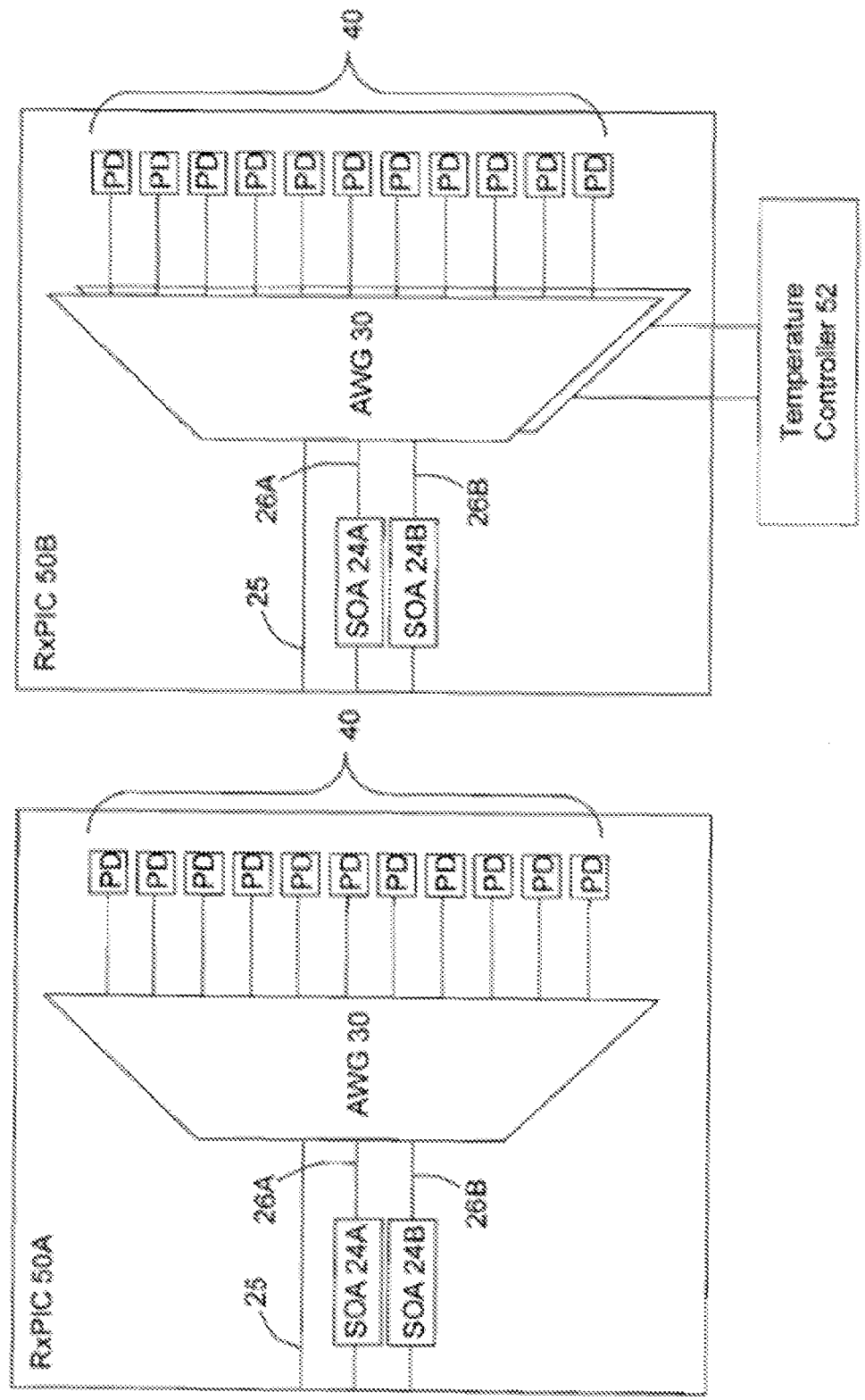
FIG. 8A and FIG. 8B illustrate various optical decombiners implementations having different available inputs according to various embodiments of the invention.

FIGS. 8A and 8B illustrate additional embodiments of the invention in which multiple amplified input paths are optically coupled to a first free space region of an AWG. FIG. 8A shows an AWG, integrated within an RxPIC 50A, having a first unamplified waveguide input 25, a first amplified waveguide input 26A, and a second amplified waveguide input 26B. The first amplified waveguide input 26A comprises at least one SOA 24A and the second amplified waveguide input 26B also comprises at least one SOA 24B. The SOAs 24A and 24B may be independently controlled using integrated power control monitors.

FIG. 8B shows a temperature tune AWG, integrated within an RxPIC 50B, that is communicatively coupled to a temperature controller that can adjust the AWG input connection by changing the AWG temperature. The integrated AWG 30 has a first unamplified waveguide input 25, a first amplified waveguide input 26A, and a second amplified waveguide input 26B. The first amplified waveguide input 26A comprises at least one SOA 24A and the second amplified waveguide input 26B also comprises at least one SOA 24B. The SOAs 24A and 24B may be independently controlled using integrated power control monitors.

The gain characteristics of the SOAs 24A and 24B may be different to provide more flexibility of the RxPIC in its integration within an optical networking system. For example, SOA 24A may have a spectral gain width for channel signals in the C band and SOA 24B may have a spectral gain width for channel signals in the L band. As a result, the same RxPIC may be individually tailored to different optical communication systems by coupling a particular waveguide input to the AWG.

B. Integrated Optical Combiner

Figure 9:
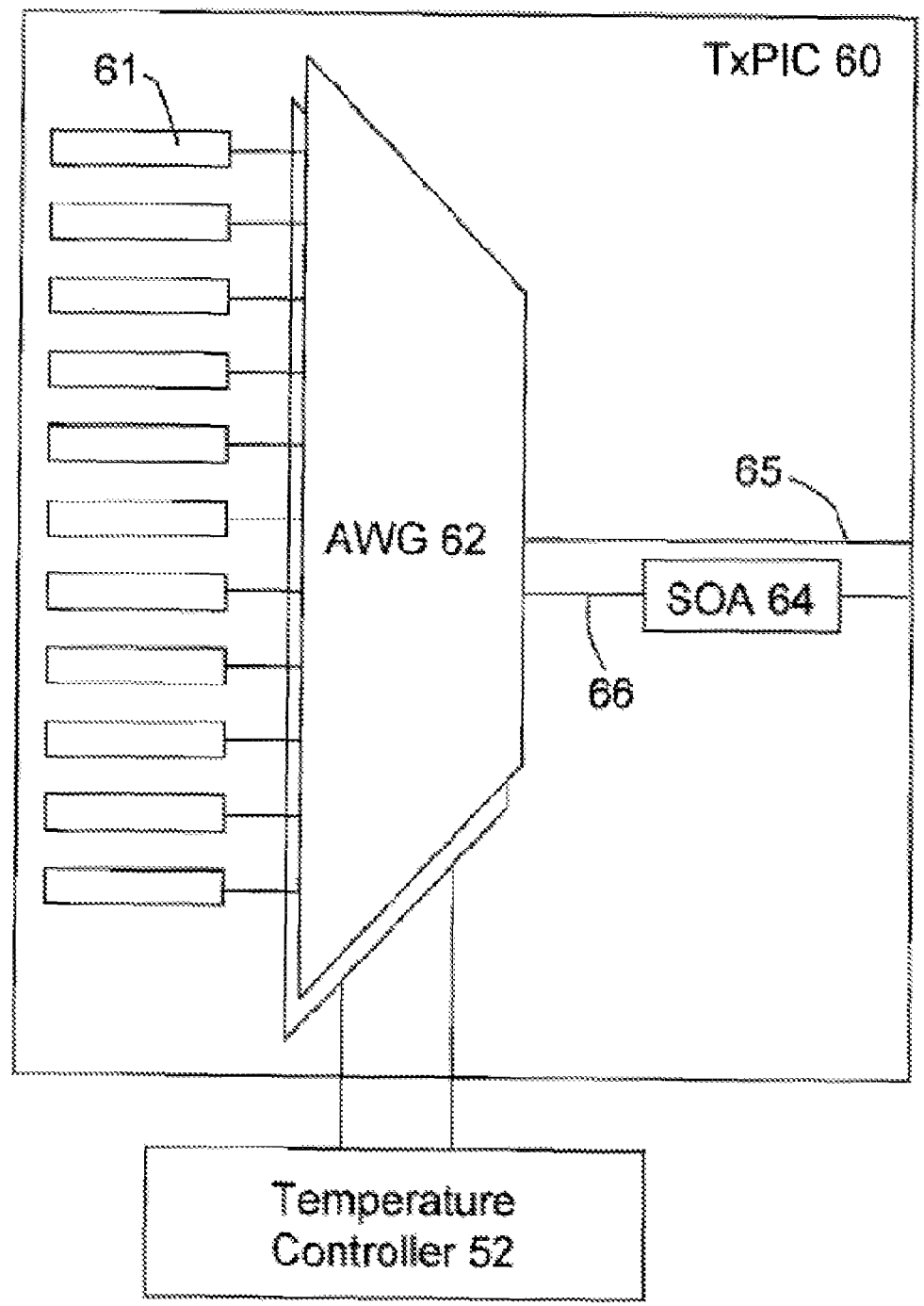
FIG. 9 illustrates an optical combiner having a plurality of different waveguide outputs according to various embodiments of the invention.

FIG. 9 illustrates an integrated optical combiner that operates in accordance with the same principles described above for the integrated optical decombiner. The optical combiner may be integrated within a TxPIC or other integrated optical circuit. Exemplary TxPICs are described in U.S. patent application, U.S. Patent Application Publication No. 20030095737, entitled "Transmitter Photonic Integrated Circuits (TxPIC) and Optical Transport Networks Employing TxPICs," which is incorporated herein by reference in its entirety.

The TxPIC 60 comprises a plurality of inputs on which multiple optical channels or wavelengths are provided to an AWG 62. An array of modulated sources 61 provide the multiple optical wavelengths as input channel signals to AWG 62. The modulated sources may be directly modulated semiconductor lasers or cw-operated semiconductor lasers with external modulators. The AWG 62 combines the multiple wavelengths using a plurality of grating arms to generate a WDM signal. The AWG 62 has a plurality of optical multiplexing paths, each having a corresponding output, on which a WDM signal may be generated. Similar to the optical decombiner, a preferred multiplexing path may be selected relative to various factors resulting in an active output transmitting a single WDM signal.

In certain embodiments, the AWG 62 has an unamplified waveguide output 65 and an amplified waveguide output 66 having at least one SOA 64. One skilled in the art will recognize that various combinations of amplified waveguide outputs and unamplified waveguide outputs may be provided. Furthermore, the gain characteristics of different SOAs on multiple amplified waveguide outputs may vary to allow integration of the TxPIC within different optical systems and operating environments.

The output waveguide 65 or 66 may be chosen for AWG 62 by temperature tuning the center wavelength of the AWG wavelength grid to have that center wavelength either directed to the output at waveguide 65 or at waveguide 66. In either case, it is necessary to make sure that the center wavelength of the AWG wavelength grid remains tuned to the wavelength grid formed by the modulated sources 61, which wavelength grid approximates a standardized wavelength grid, such as the ITU grid known in the art.

C. Integrated Power Monitoring

The amplified waveguide inputs on the decombiner and the amplified waveguide outputs on the combiner may include power monitoring and/or controlling functionality to ensure that a power level or range is maintained on a WDM signal. One skilled in the art will recognize that various types of power monitoring methods may be used in accordance with the present invention. FIGS. 10A, 10B, 11A, and 11B illustrate such power monitoring structure and function, and are intended merely as examples and should not be construed in limiting the available types of power monitoring that may be integrated within an optical combiner or decombiner.

According to various embodiments of the invention, a power monitor is integrated to detect a power level of an optical signal within an integrated circuit, such as a TxPIC or an RxPIC. The power monitor may be positioned to detect an input power to an optical amplifier or an output power of the optical amplifier. Using information from the power monitor, the gain across the optical amplifier may be adjusted and optimized. The power monitor may be designed to minimize the effects of amplified spontaneous emissions (hereinafter, "ASE"). The power monitor may also be designed to monitor the combination of ASE and the optical signal along the optical amplifier cavity and infer the signal strength relative to the ASE.

Figure 10A:
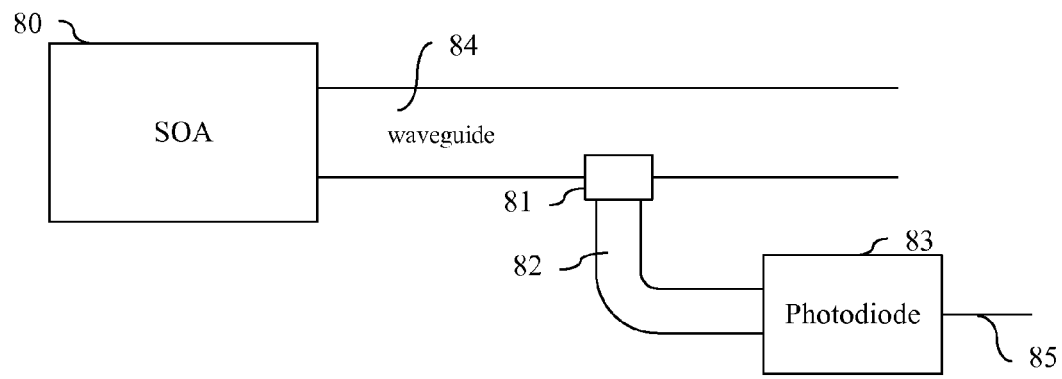
FIG. 10A illustrates an integrated optical tap and corresponding photodetector according to various embodiments of the invention.

FIG. 10A illustrate an integrated power monitoring device in which an optical tap is used according to various embodiments of the invention. An SOA 80, integrated with an amplified input of a decombiner or an amplified output of a combiner, provides an amplified WDM signal on waveguide 84. An optical tap 81, such as an MMI coupler, is coupled within waveguide 84 to allow a portion of the WDM signal to be tapped and transmitted in waveguide 82. A photodiode 83, such as a PIN diode or photo-avalanche diode, converts the tapped optical signal into a corresponding electrical signal 85.

The electrical signal 85 may be transmitted to a controller that identifies a power level on the amplified WDM signal. The controller may adjust the gain across the SOA 80 in order to ensure that the power level on the amplified WDM signal is at a preferred level or within a particular range. According to various embodiments of the invention, the controller may be located off-chip or integrated within the chip.

In other embodiments of the invention, the optical tap may be located at an input of the SOA 80 to enable detection of the input optical power level on the SOA 80. Using this information, the gain of the SOA 80 may be adjusted to provide a preferred power level at its output.

Figure 10B:
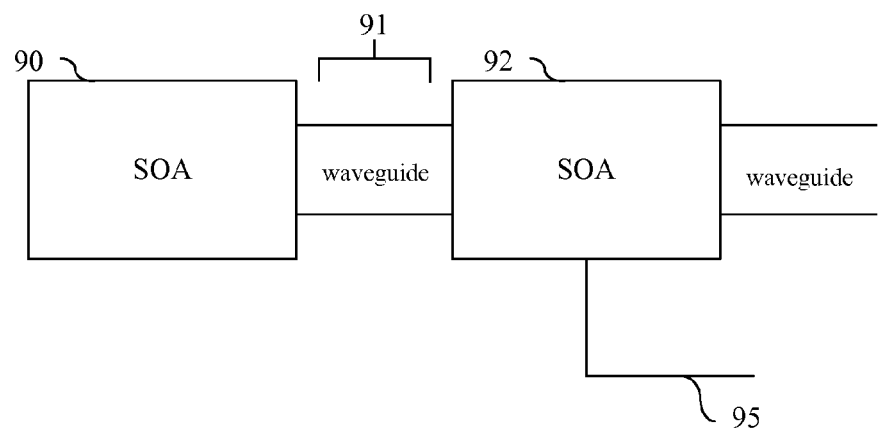
FIG. 10B illustrates an in-line photodetector according to various embodiments of the invention.

FIG. 10B illustrates an integrated power monitoring device in which an in-line optical sensor is used according to various embodiments of the invention. A first SOA 90 is optically coupled with an in-line photodetecting structure, such as a second SOA 92, and an electrical isolation region 91 is provided between the two SOAs. By controlling the bias on the second SOA 92, a portion of the optical light is absorbed within the SOA 92 and a photocurrent is generated on line 95. The level of absorption may be varied by changing the size and characteristics of the absorption region of the second SOA 92.

The photocurrent from this second SOA 92 may be analyzed to determine an optical signal power. For example, the photocurrent may be transmitted to an on-chip or off-chip controller that determines an optical power level and adjusts the gain across the first SOA 90. This gain may also compensate for losses caused by the in-line photo-detection and ensure that an optical power level is maintained.

Depending on the signal wavelength and relative location of the gain peak of the second SOA 92, the loss from the optical detections may vary significantly. For example, a 3 dB to a 9 dB loss may be caused by an unbiased SOA waveguide functioning as the second SOA 92. Depending on the environment in which it is operating, this loss may be too significant to provide effective optical signal detection.

Figure 11A:
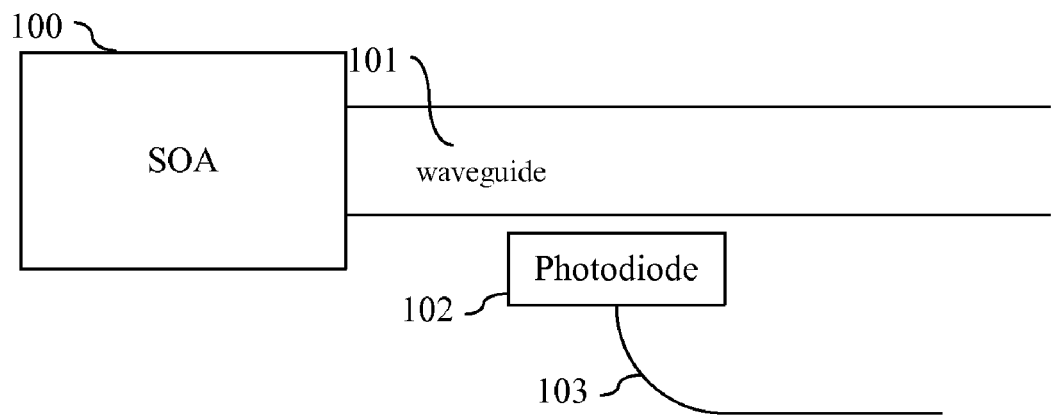
FIG. 11A illustrates an evanescent parallel photodetector according to various embodiments of the invention.

FIG. 11A illustrates an integrated power monitoring device in which a parallel optical sensor is used according to various embodiments of the invention. An SOA 100 is provided in an amplified path and produces an amplified optical signal on waveguide 101. One skilled in the art will recognize that the amplified optical signal will propagate within the waveguide 101 and a portion of the signal power will extend outside of the waveguide 101. This portion of the optical signal is oftentimes referred to as an "evanescent optical tail."

A photodetector 102 is disposed proximate to the waveguide 101 to allow it to detect at least a portion of this evanescent optical tail. The photodetector 102 may be a PIN diode, an avalanche photodiode, or any other photodetector known by one of skill in the art. The photodetector 102 detects a portion of the evanescent optical tail and generates a corresponding electrical signal 103. The power level on the optical signal within the waveguide 101 may be identified from the electrical signal 103. For example, the electrical signal 103 may be processed by a controller (off-chip or on-chip) in order to identify this power level.

The controller may adjust the gain of the SOA 100 in response to the processed electrical signal so that the optical signal propagating within waveguide 101 is at a preferred power level or within a preferred range. One skilled in the art will recognize that a parallel photodetector does not cause a significant power loss in the detection process but may not be as accurate as other structures and methods of optical detection. Additionally, the manufacturing process for the integrated parallel photodetector may be difficult due to the close proximity in which it must be located to the waveguide.

Figure 11B:
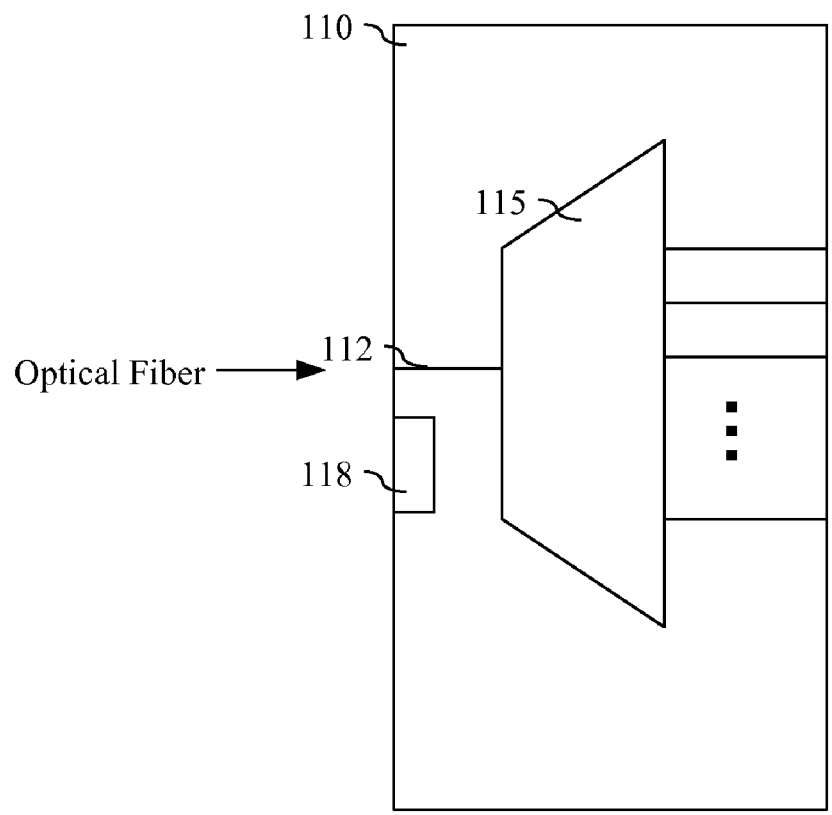
FIG. 11B illustrates a scattered light sensing photodetector according to various embodiments of the invention.

FIG. 11B illustrates an integrated power monitoring device in which an integrated optical sensor is used to detect scattered light from the input of a fiber according to various embodiments of the invention. FIG. 11B shows an integrated optical sensor on an RxPIC 110 on which a photodetector 118 is located proximate to the facet of an integrated waveguide input 112 of an optical decombiner 115. This photodetector 118 detects scattered light from the coupling between the integrated waveguide and the optical fiber. In response to the scattered light, the photodetector 118 generates a photocurrent from which an optical power may be derived. The photodetector 118 may be a PIN diode, photo-avalanche diode, or other diode.

The scattered light photodetector may also be used in a TxPIC in which detection is performed on optical signals entering an optical combiner. One skilled in the art will recognize that other types of detectors may also be used, such as a ring resonator, to monitor and control the optical power in an integrated optical combiner or decombiner.

While the present invention has been described with reference to certain exemplary embodiments, those skilled in the art will recognize that various modifications may be provided. Accordingly, the scope of the invention is to be limited only by the following claims.

We claim:

1. An integrated optical decombiner circuit comprising:
an unamplified waveguide input configured to be optically coupled to an optical fiber for receiving a WDM signal;
an amplified waveguide input configured to be optically coupled to the optical fiber for receiving the WDM signal;
an input free space region that interfaces with the unamplified waveguide input and the amplified waveguide input;
a plurality of grating arms, coupled to the input free space free region;
an output free space region coupled to the plurality of grating arms, the output free space region having a plurality of waveguide outputs, each of the plurality of waveguide outputs supplying a corresponding one of a plurality of optical signals, each of the plurality of optical signals having a corresponding one of a plurality of wavelengths; and
wherein the unamplified waveguide input is associated with a first plurality of demultiplexing paths through the optical combiner circuit and the amplified waveguide input is associated with a second plurality of demultiplexing paths through the optical decombiner circuit.

2. The integrated optical decombiner circuit of claim 1 wherein the input free space region, the plurality of grating arms, and the output free space region comprise an arrayed waveguide grating.

3. The integrated optical decombiner circuit of claim 1 wherein a single input, selected from the amplified waveguide input and the unamplified waveguide input, is optically coupled to the optical fiber to define a demultiplexing path from among the first and second pluralities of demultiplexing paths for the WDM signal.

4. The integrated optical decombiner circuit of claim 1 further comprising a temperature controller coupled to control a temperature of the integrated optical decombiner circuit.

5. The integrated optical decombiner circuit of claim 4 wherein the temperature controller is coupled to a heater that controls the temperature of the integrated optical decombiner circuit.

6. The integrated optical decombiner circuit of claim 1 wherein the amplified waveguide input comprises an integrated optical detector.

7. The integrated optical decombiner circuit of claim 6 wherein the integrated optical detector comprises a tap coupler and photodetector.

8. The integrated optical decombiner circuit of claim 6 wherein the integrated optical detector comprises an in-line photodetector.

9. The integrated optical decombiner circuit of claim 6 wherein the integrated optical detector comprises an evanescent parallel photodetector.

10. The integrated optical decombiner circuit of claim 6 wherein the integrated optical detector comprises a light scattered photodetector.

11. The integrated optical decombiner circuit of claim 6 wherein the integrated optical detector comprises a resonator ring and photodetector.

12. The integrated optical decombiner circuit of claim 6 further comprising a gain controller that controls a gain across the amplified waveguide input.

13. The integrated optical decombiner circuit of claim 1 wherein the amplified waveguide input comprises a semiconductor optical amplifier.

14. The integrated optical decombiner circuit of claim 1 further comprising a plurality of photodetectors, each of the plurality of photodetectors being associated with a corresponding one of the plurality of waveguide outputs, each of the plurality of photodetectors being configured to convert a corresponding one of the plurality of optical signals into a corresponding one of a plurality of electrical signals.

15. The integrated optical decombiner circuit of claim 1 wherein the input free space region, the plurality of grating arms, the output free space region and the plurality of photodetectors are integrated on a single monolithic semiconductor substrate.

16. An integrated optical combiner circuit comprising:
a plurality of waveguide inputs, each of which being configured to carry a corresponding one of a plurality of optical signals, each of the plurality of optical signals having a corresponding one of a plurality of wavelengths;
an input free space region, that interfaces with the plurality of waveguide inputs;

a plurality of grating arms, coupled to the input free space region, that transmit the plurality of optical signals;

an output free space region, coupled to the plurality of grating arms, that combines the plurality of optical signals onto an active waveguide output selected from a plurality of waveguide outputs; and wherein the plurality of waveguide outputs comprises an amplified waveguide output and an unamplified waveguide output.

17. The integrated optical combiner circuit of claim 16 wherein the input free space region, the plurality of grating arms, and the output free space region comprise an arrayed waveguide grating.

18. The integrated optical combiner circuit of claim 16 further including a plurality of optical multiplexing paths provided between the input free space region and the output free space region.

19. The integrated optical combiner circuit of claim 16 further comprising a temperature controller coupled to control a temperature of the integrated optical combiner circuit.

20. The integrated optical combiner circuit of claim 19 wherein the temperature controller includes a heater.

21. The integrated optical combiner circuit of claim 16 wherein the amplified waveguide output comprises an integrated optical detector.

22. The integrated optical combiner circuit of claim 21 wherein the integrated optical detector comprises a tap coupler and photodetector.

23. The integrated optical combiner circuit of claim 21 wherein the integrated optical detector comprises an in-line photodetector.

24. The integrated optical combiner circuit of claim 21 wherein the integrated optical detector comprises an evanescent parallel photodetector.

25. The integrated optical combiner circuit of claim 21 wherein the integrated optical detector comprises a light scattered photodetector.

26. The integrated optical combiner circuit of claim 21 wherein the integrated optical detector comprises a resonator ring and photodetector.

27. The integrated optical combiner circuit of claim 21 further comprising a gain controller that controls a gain across the amplified waveguide output.

28. A method for configuring an optical decombiner, the method comprising:

monitoring an optical parameter associated with each of a plurality of optical signals, each of which propagating through to a corresponding one of a plurality of optical demultiplexing paths in the optical decombiner, each of the plurality of optical demultiplexing paths being associated with a respective one of a plurality of waveguide inputs;

selecting one of the plurality of optical demultiplexing paths;

coupling an optical fiber to one of the plurality of waveguide inputs, said one of the plurality of waveguide inputs corresponding to the said one of the plurality of optical demultiplexing paths; and wherein the plurality of waveguide inputs comprises an amplified waveguide input and an unamplified waveguide input.

29. The method of claim 28 wherein the configurable optical decombiner is integrated on the same substrate as a plurality of photodetectors.

30. The method of claim 28 further comprising tuning a connection between said one of the plurality of waveguide inputs and an input free space region of the configurable optical decombiner by adjusting a temperature of the configurable optical decombiner.

31. The method of claim 28 wherein the amplified waveguide input comprises a semiconductor optical amplifier and an integrated photodetection device.

32. The method of claim 31 wherein the integrated photodetection device comprises an integrated photodetector selected from a group consisting of a tap coupled photodetector, an in-line photodetector, a parallel photodetector, a scattered light photodetector and a resonator ring photodetector.

33. An integrated optical decombiner circuit comprising:

an unamplified waveguide input configured to be optically coupled to an optical fiber for receiving a wavelength division multiplexed (WDM) signal;

an amplified waveguide input configured to be optically coupled to the optical fiber for receiving the WDM signal;

an optical decombiner, having a plurality of inputs coupled to the unamplified waveguide input and the amplified waveguide input, that separates a plurality of optical signals from the WDM signal and transmits each of the plurality of optical signals on a corresponding one of a plurality of outputs;

a plurality of photodetectors coupled to the plurality of outputs to receive the plurality of optical signals, each of the plurality of photodetectors being configured to convert a respective one of the plurality of optical signals into a corresponding one of a plurality of electrical signals; and wherein the unamplified waveguide input is associated with a first plurality of demultiplexing paths through the optical decombiner and the amplified waveguide input is associated with a second plurality of demultiplexing paths through the optical decombiner.

34. The optical decombiner circuit of claim 33 wherein the optical decombiner and the plurality of photodetectors are integrated on a single semiconductor substrate.

35. The optical decombiner circuit of claim 33 further comprising an electrical interface that allows a temperature controller to adjust a temperature of the optical decombiner.

36. The optical decombiner circuit of claim 33 wherein the amplified waveguide input comprises at least one semiconductor optical amplifier that applies a gain to the WDM signal.

* * * * *